United States Patent
Cronin et al.

(10) Patent No.: US 8,540,438 B1
(45) Date of Patent: Sep. 24, 2013

(54) SYSTEMS AND METHODS FOR POSITIONING A CAMERA CRANE

(75) Inventors: Matthew J. Cronin, Phoenix, AZ (US);
Pablo Tovar, Phoenix, AZ (US);
Michael Kay Pack, Chandler, AZ (US);
Ron K. Keys, Columbus, MS (US);
Richard A. Laitinen, Surprise, AZ (US)

(73) Assignee: CamMate Systems. Inc., Chandler, AZ (US)

( * ) Notice: Subject to any disclaimer, the term of this patent is extended or adjusted under 35 U.S.C. 154(b) by 256 days.

(21) Appl. No.: 13/070,666

(22) Filed: Mar. 24, 2011

(51) Int. Cl.
*G03B 17/00* (2006.01)

(52) U.S. Cl.
USPC .......................................................... 396/428

(58) Field of Classification Search
USPC ............... 396/5, 50, 428; 348/208.3
See application file for complete search history.

(56) References Cited

U.S. PATENT DOCUMENTS

| | | | |
|---|---|---|---|
| 4,907,768 A | 3/1990 | Masseron | |
| 4,943,019 A * | 7/1990 | Mester | 248/123.11 |
| 5,434,614 A | 7/1995 | Dainty | |
| 5,671,932 A | 9/1997 | Chapman | |
| 5,900,925 A | 5/1999 | Navarro | |
| 5,940,645 A | 8/1999 | Bonin | |
| 5,963,749 A | 10/1999 | Nicholson | |
| 6,086,256 A | 7/2000 | Paschke | |
| 6,191,842 B1 | 2/2001 | Navarro | |
| 6,263,160 B1 | 7/2001 | Lewis | |
| 6,327,791 B1 | 12/2001 | Norcross | |
| 6,450,706 B1 | 9/2002 | Chapman | |
| 6,478,427 B1 * | 11/2002 | Morris et al. | 352/243 |
| 6,517,207 B2 | 2/2003 | Chapman | |
| 6,579,016 B2 | 6/2003 | Chapman | |
| 6,685,148 B2 | 2/2004 | Zadok | |
| 6,705,773 B2 | 3/2004 | Fix | |
| 6,752,541 B1 | 6/2004 | Dykyj | |
| 6,776,488 B2 | 8/2004 | Burbulla | |
| 6,820,980 B1 | 11/2004 | Romanoff | |
| 7,010,036 B1 | 3/2006 | Mory | |
| 7,037,006 B2 | 5/2006 | Chapman | |
| 7,101,045 B2 * | 9/2006 | Romanoff et al. | 352/243 |
| 7,121,745 B2 | 10/2006 | Chapman | |
| 7,451,028 B2 | 11/2008 | Pillar | |
| 7,672,768 B2 | 3/2010 | Narisawa | |
| 7,715,962 B2 | 5/2010 | Rowe | |
| 8,033,742 B1 | 10/2011 | Chapman | |
| 8,333,520 B1 * | 12/2012 | Cronin et al. | 396/428 |
| 2003/0076480 A1 * | 4/2003 | Burbulla | 352/243 |
| 2005/0007553 A1 | 1/2005 | Romanoff et al. | |
| 2005/0052531 A1 | 3/2005 | Kozlov | |
| 2006/0119701 A1 | 6/2006 | King | |
| 2006/0269279 A1 * | 11/2006 | Valles Navarro et al. | 396/428 |

(Continued)

FOREIGN PATENT DOCUMENTS

EP 0 725 758 11/1998

*Primary Examiner* — Rodney Fuller
(74) *Attorney, Agent, or Firm* — Letham Law Firm LLC; Lawrence Letham

(57) ABSTRACT

Systems and methods for positioning a camera crane include maintaining the position of a camera head in accordance with the inclination and rate of change of inclination of the arm of the crane. The inclination and rate of change are detected by an inclination detector and an angular detector respectively. The camera head may be positioned in accordance with the inclination as detected by the inclination detector. The rate of changing the position of the camera head may be in accordance with the rate of change detected by the angular detector.

24 Claims, 10 Drawing Sheets

(56) References Cited

U.S. PATENT DOCUMENTS

| | | |
|---|---|---|
| 2007/0061054 A1 | 3/2007 | Rowe |
| 2007/0155228 A1 | 7/2007 | Nama |
| 2007/0230947 A1 | 10/2007 | Chapman |
| 2008/0312770 A1 | 12/2008 | Alvarez |
| 2009/0097840 A1* | 4/2009 | Amadril et al. ............... 396/428 |
| 2009/0148150 A1 | 6/2009 | Valles Navarro |
| 2009/0192715 A1 | 7/2009 | Gunsaulis et al. |
| 2010/0124414 A1 | 5/2010 | Brown |
| 2010/0166411 A1 | 7/2010 | Gladstone |
| 2010/0278523 A1 | 11/2010 | Brown |
| 2011/0026913 A1* | 2/2011 | Dumm .......................... 396/428 |
| 2011/0031203 A1 | 2/2011 | Chapman |
| 2011/0255854 A1 | 10/2011 | Chapman |
| 2012/0051733 A1* | 3/2012 | Chapman ..................... 396/428 |
| 2012/0163792 A1* | 6/2012 | Pace et al. .................... 396/329 |

* cited by examiner

SYSTEMS AND METHODS FOR POSITIONING A CAMERA CRANE

FIELD OF THE INVENTION

Embodiments of the present invention relate to systems and methods for moving and/or positioning a camera crane.

BACKGROUND OF THE INVENTION

Camera cranes may be used to position and/or move a camera coupled to the crane relative to a location and/or scene that the camera is recording (e.g., filming). A camera crane enables the camera operator to position the camera to record with perspectives that are more difficult to attain without a camera crane. A user of a camera crane may benefit from a crane that uses the position and the rate of movement of the arm of the crane to maintain the camera head level with respect to a reference plane. A user of a camera crane may further benefit from a system that monitors a position of a counterweight coupled to an arm of the crane and the extension of the arm.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
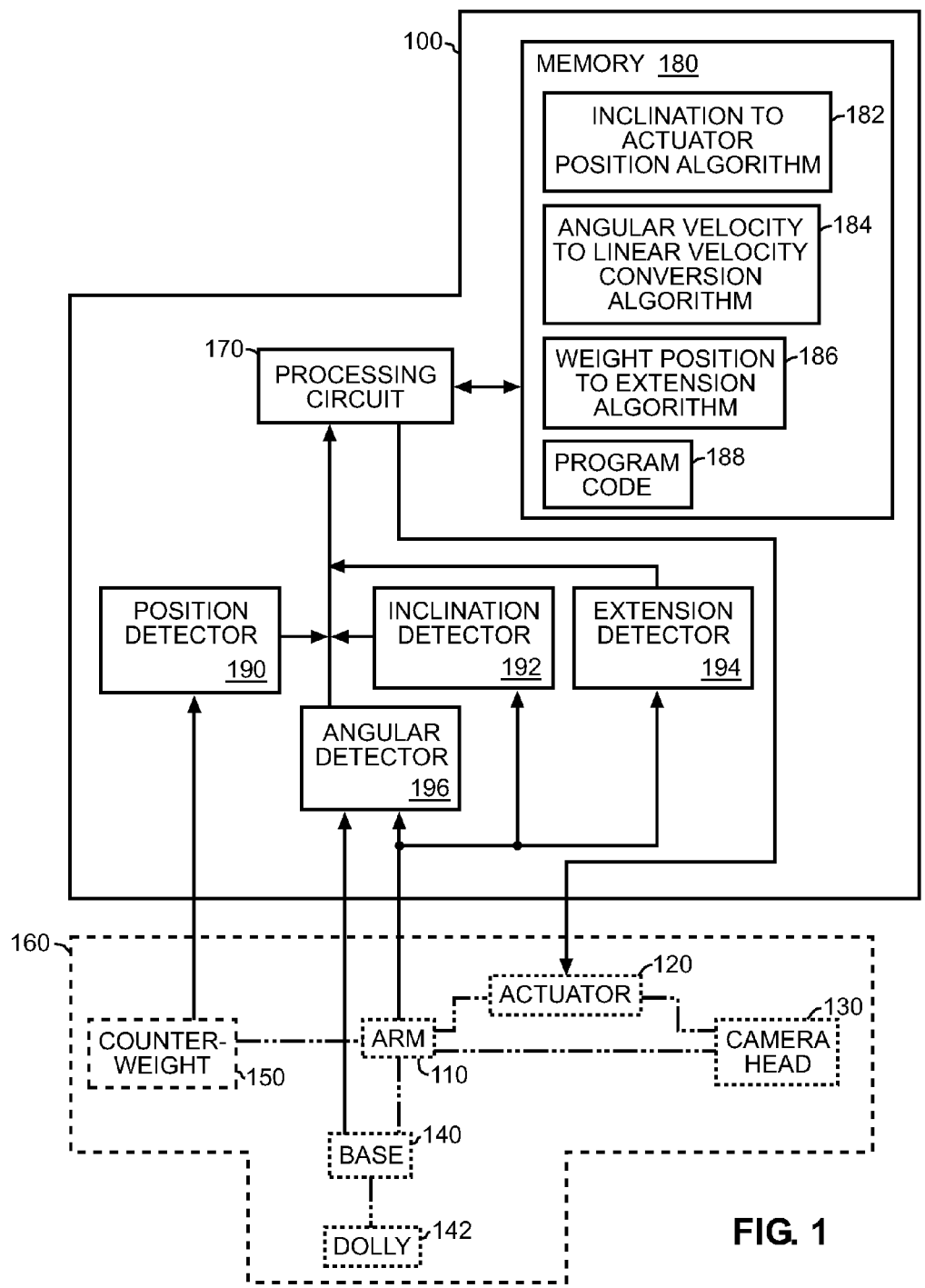
FIG. 1 is a functional block diagram of a control system for position of camera head of a crane and for monitoring a counterweight and extension of the arm of the crane according to various aspects of the present invention.

A camera crane (e.g., boom) may position a camera with respect to a scene (e.g., set, location, event, person) being recorded (e.g., filmed, captured). A camera crane may move a camera in three dimensions (e.g., Cartesian x, y, and z). A camera crane may move a camera from one position to another position in the three dimensional space. A camera crane may move a camera at a rate in each dimension. A camera crane may move a camera at varying rates in any one or all three dimension. A camera crane may hold a camera steady (e.g., substantially motionless) at a position in a three dimensional space. An operator may control movement of a camera crane to position a camera. Mechanical movement of a camera crane may be powered by any conventional source (e.g., human power, electric motors, hydraulic devices, pneumatic devices, servo motors) that provides a force to move an object.

It is desirable that a camera crane start, stop, and/or continue movement of a camera without causing a disruption (e.g., jerky motion, oscillation at start of motion, oscillation at stop of motion, bounce) in the quality of the image captured by the camera. A control system according to various aspects of the present invention may detect and/or direct movement of a camera crane to reduce disruptions in the quality of the image captured by the camera, detect conditions in the operation of the crane that may damage a camera, and direct movement of the crane to reduce possible damage to a camera.

A camera crane 160 may include arm 110, actuator 120, camera head 130, base 140, dolly 142, and counterweight 150.

A dolly may move crane 160 between geographic locations. A dolly may include any conventional device (e.g., wheels, rails) for facilitating movement of the crane from one geographic location to another geographic location. A force that moves a dolly may be provided by any conventional source as discussed above. A dolly supports base 140, arm, 110, counterweight 150, actuator 120, and camera head 130. A dolly may support base 140, arm, 110, counterweight 150, actuator 120, and camera head 130 while the crane moves a camera in a three dimensional space. A dolly may support base 140, arm, 110, counterweight 150, actuator 120, and camera head 130 to permit rapid movement (e.g., start, stop, continuation) of a camera between positions in a three-dimensional space without disrupting the quality of the image captured by the camera. A dolly may hold base 140, arm, 110, counterweight 150, actuator 120, and camera head 130 steady.

In an implementation, camera crane 200 includes dolly 242. Dolly 242 includes wheels 244 for moving dolly 242 from one geographic location to another geographic location. Dolly 242 may be anchored (e.g., held immobile, secured) to provide support to base 240, arm 210, actuator 220, camera head 230, camera 234, and counterweight 250. Anchoring may include holding wheels 244 immobile and/or coupling dolly 242 to a surface (e.g., earth, floor).

A base mechanically couples to a dolly. A base supports arm, 110, counterweight 150, actuator 120, and camera head 130. A base may support arm, 110, counterweight 150, actuator 120, and camera head 130 while the crane moves a camera in a three dimensional space. A base may support arm, 110, counterweight 150, actuator 120, and camera head 130 to permit rapid movement of a camera between positions in a three-dimensional space without disrupting the quality of the image captured by the camera. A base may hold arm, 110, counterweight 150, actuator 120, and camera head 130 steady.

In an implementation, base 240 mechanically couples to dolly 242 and pivotally couples to segment 212 of arm 210 at pivot 244. Base 240 supports arm 210, actuator 220, camera head 230, camera 234, and counterweight 250.

An arm mechanically couples to base 140. An arm may couple to base 140 at a proximate end portion of the arm. An arm mechanically couples to a base in such a manner so as to permit movement of the arm in a three dimensional space. An arm supports counterweight 150, actuator 120, and camera head 130. An arm may support counterweight 150, actuator 120, and camera head 130 while the crane moves a camera in a three dimensional space. An arm may support counterweight 150, actuator 120, and camera head 130 to permit rapid movement of a camera between positions in a three-dimensional space without disrupting the quality of the image captured by the camera. A base may hold arm, 110, counterweight 150, actuator 120, and camera head 130 steady.

An arm may move (e.g., rotate, swing) horizontally (e.g., along an x-axis, around a vertical axis, around a y-axis) with respect to base 140. An arm may move (e.g., rotate, boom, rise, descend) vertically (e.g., along a y-axis, around a horizontal axis, around an x-axis) with respect to base 140. An arm may move (e.g., extend, retract, telescope) toward or away from (e.g., z-axis) base 140. An arm may move along one or more axes at a time. An arm may move at a rate along one or more axes at a time. A rate of movement of an arm may be different along one or more axes. A rate of movement of an arm may change without disrupting the quality of the image captured by the camera.

In an implementation, segment 212 of arm 210 moveably couples to base 240. Pivot 244 defines a horizontal pivot point (e.g., x-axis). Arm 210 may rotate around a vertical pivot point (not shown) to rotate around base 240. Arm 210 may rotate around pivot 244 to move arm 210 up and down and shown in FIGS. 2-4. Rotation of arm 210 around pivot 244 may be detected with respect to a reference. A reference may include base 240. Movement of arm 210 around pivot 244 positions arm 210 at an angle with respect to base 240. A reference may include a plane. A plane may be substantially parallel to a surface upon which dolly 242 is positioned. A plane may include a flat surface (e.g., floor) or an inclined surface (e.g., hill). Movement of arm 210 around pivot 244 positions arm 210 at an angle with respect to the plane. A plane may be defined with respect to a direction of gravity (e.g., center of earth). Movement of arm 210 around pivot 244 may position arm 210 at an angle with respect to the direction of gravity.

A direction of gravity is substantially stable and predictable on earth at least within a limited geographic area (e.g., an area the size of an extended crane). A direction of gravity at a geographic location will be substantially the same during a period of time (e.g., hour, day, month, year). A particular position of arm 210 with respect to a direction gravity may be detected at a geographic location. Arm 210 and/or crane 200 may be moved (e.g., repositioned) from the particular position after detecting the particular position. Information regarding the particular position may be recorded for later reference. At a later time, arm 210 may be repositioned at the particular position detected earlier. Positioning arm 210 with respect to gravity permits accurate, repeatable repositioning. Positioning arm 210 with respect to gravity permits accurate, repeatable positioning regardless of the terrain upon which dolly 242 is positioned and/or the orientation of dolly 242 with respect to gravity.

A direction of gravity may be used to define a plane for detecting an angle of inclination ("AI") of arm 210. A plane perpendicular to a direction of gravity is referred to herein as a horizontal plane ("HP"). The angle of inclination (e.g., 302, THETA) of arm 210 may be measured with respect to the horizontal plane.

Arm 210 includes segments 212, 214, and 216. Segments 214 and 216 may move with respect to each other and segment 212. Segments 214 and/or 216 may extend to move a distal end portion of arm 210 away from base 240. Segments 214 and/or 216 may retract to move a distal end portion of arm 210 toward base 240. Segments 214 and 216 may move in a coordinated manner to extend and/or retract.

Arm 210 has a length 270 as measured from an axis of pivot 244 to the end portion of segment 216. Segment 214 extends a length 274 from segment 212. Segment 216 extends a length 272 from segment 214. As arm 210 extends, lengths 270, 272, and 274 increase. As arm 210 retracts, lengths 270, 272, and 274 decrease. Lengths 272 and 274 may increase and/or decrease in proportion to each other (e.g., at a similar rate, a similar amount).

In an implementation, the position and/or length of arm 210 is controlled by one or more servo motors. A servo motor may receive information from an operator (e.g., user interface) and position (e.g., rotate, extend, retract) arm 210 in accordance with the information.

A counterweight may mechanically couple to arm 110. A counterweight may couple to a proximate end of arm 110. A counterweight couples to arm 110 between an end of the proximate portion of arm 110 and the point at which arm 110 mechanically couples to base 140. A counterweight may balance arm 110 on base 140. A magnitude of the weight of a counterweight may be proportional to a magnitude of the weight of arm 110 opposite the counterweight beyond the point where arm 110 mechanically couples to base 140. The magnitude of the weight of arm 110 opposite the counterweight beyond the point where arm 110 mechanically couples to base 140 may include the weight of a camera. A counterweight may balance arm 110 that includes a camera.

A counterweight may be positioned between an end of the proximate portion of arm 110 and the point where arm 110 mechanically couples to base 140. The position of a counter weight may be proportional to a length of arm 110. A counterweight may move between an end of the proximate portion of arm 110 and the point where arm 110 mechanically couples to base 140. A counterweight may move between an end of the proximate portion of arm 110 and the point where arm 110 mechanically couples to base 140 to maintain balance of arm 110 on base 140. Movement of a counterweight may be proportional a change in a length (e.g., extension, retraction) of arm 110. Movement of a counterweight that is not proportional to a change in a length of arm 110 may result in arm 110 not being balanced (e.g., imbalanced) with respect to base 140. A situation in which arm 110 is not balanced with respect to base 140 may cause crane 160 to be unstable. Instability in crane 160 may result in erratic and/or unpredictable movements of arm 110, counterweight 150, camera head 130, base 140, dolly 142 and/or a camera mounted to camera head 130.

In an implementation, counterweight 250 mechanically couples to arm 210 between a proximate end portion (e.g., left portion in drawing) of arm 210 and pivot 244. Counterweight 250 may move along track 252 between the proximate end portion of arm 210 and pivot 244. A distance 260 between counterweight 250 and pivot 244 is proportional to a length 270 of arm 210.

As arm 210 extends and length 270 increases, counterweight 250 moves away from pivot 244 such that distance 260 increases. As arm 210 retracts and length 270 decreases, counterweight 250 moves toward pivot 244 such that distance 260 decreases. Moving counterweight 250 away from pivot 244 as arm 210 extends and toward pivot 244 as arm 210 retracts operates to balance arm 210 on base 240. A balanced arm may be moved with less force than an unbalanced arm. Movements of a balanced arm may result in fewer disruptions in the quality of the image captured by a camera.

A magnitude of the weight of counterweight 250 is a factor of a position of pivot 244 with respect to a length of segment 212, a magnitude of the weight of arm 210, a magnitude of weight of actuator 220, camera head 230, and camera 234.

As discussed in greater detail below, in the event that arm 210 becomes unbalanced, pin 254 may move to fix the position of counterweight 250 with respect to pivot 244 to reduce the chance that arm 210 moves erratically or in an unpredictable manner.

A camera head may mechanically couple to arm 110. A camera head may mechanically couple to a distal portion of arm 110. A camera head may pivotally couple to arm 110. A camera head may mechanically couple to a camera. A camera head may move with respect to arm 110. A camera head may move with respect to a horizontal plane. A camera head may move to position a camera. A camera head may move to position a camera parallel to a horizontal plane. A camera head may hold a camera steady.

In an implementation, camera head 230 mechanically couples to arm 210 at a distal end portion (e.g., right portion in drawing) of arm 210. Camera head 230 pivotally couples to arm 210 at pivot 232. Camera 234 is mounted on camera head 230. Camera head 230 may be pivoted to position camera mount 232 relative to a plane. A plane may include the same plane used as a reference to detect an inclination of arm 210. For example, camera mount 232 and arm 210 may be positioned relative to a horizontal plane.

Positioning camera head 230 with respect to the same plane used to position arm 210 provides certain advantages especially when the plane is referenced to a direction of gravity. Positioning arm 210 with respect to a stable, known reference such as a horizontal plane permits camera head 230 to be accurately position with respect to arm 210 as opposed to being independently positioned relative to the horizontal plane.

For example, detectors (e.g., sensors) could be used to independently detect the orientation of camera head 230 and the orientation of arm 210 with respect to a horizontal plane. Camera head 230 and arm 210 could be positioned relative to the horizontal plane with respect to their independently detected positions. However, because gravity provides an accurate, stable reference, a detector may detect an angle of inclination of arm 210 with respect to the horizontal plane. The angle of inclination of arm 210 may then be used to position camera head 230. Positioning camera head 230 relative to arm 210 and arm 210 relative to the horizontal plane in turn positions camera head 230 relative to the horizontal plane. Accordingly, the angle of inclination of arm 210 may be used to move camera head 230 so that camera mount 232 is substantially continuously parallel to the horizontal plane without independently measuring the orientation of camera head 230 to the horizontal plane.

An actuator may mechanically couple to arm 110. An actuator may mechanically couple to camera head 130. An actuator may couple between arm 110 and camera head 130. An actuator may move camera head 130. An actuator may position (e.g., move, orient) camera head 130 with respect to arm 110. An actuator may include any conventional device (e.g., linear, rotational, incremental, absolute) that may move camera head 130 with respect to arm 110. As discussed above, arm 110 may be positioned relative to a horizontal plane. An actuator may position camera head 130 relative to arm 110, so an actuator may indirectly position camera head 130 relative to a horizontal plane.

An actuator may cooperate with camera head 130 and/or arm 110 to position a camera coupled to camera head 130, to move a camera coupled to camera head 130, and/or hold a camera coupled to camera head 130 steady. An actuator may cooperate with camera head 130 and/or arm 110 to position, move, and/or hold a camera coupled to camera head 130 with respect to a horizontal plane. An actuator may cooperate with camera head 130 and/or arm 110 to position a portion of camera head 130 parallel to a horizontal plane. An actuator may cooperate with arm 110 to move camera head 130 to a particular position in an three-dimensional space.

A camera may move vertically (e.g., tilt) and horizontally (e.g., pan) with respect to camera mount 232. An actuator may cooperate with camera head 130 and/or arm 110 to maintain camera mount 232 at a fixed angle (e.g., parallel) with respect to a horizontal plane to provide a reference point for panning and tilting the camera. A reference angle may be used to move the camera, camera head, and/or arm from one position to another position along any axis. Generally, an actuator cooperates with camera head 130 and/or arm 110 to maintain camera mount 232 parallel to a horizontal plane.

Depending on a direction of movement of arm 110, actuator 120 may move camera head 130 with respect to arm 110 to maintain the plane of the camera (e.g., camera plane, CP) parallel to the horizontal plane. Horizontal movement of arm 110 may not necessitate movement of camera head 130 if dolly 143 is parallel (e.g., base 140 perpendicular) to the horizontal plane. Vertical movement of arm 110, whether by up/down movement or extension/retraction of arm 110, may move camera mount 232 so that the camera plane is no longer parallel to the horizontal plane. Actuator 120 may move camera head 130 to position camera head 130 with respect to arm 110 so that camera mount 232 is parallel with the horizontal plane.

A rate of movement of an actuator may correspond to a rate of movement of camera mount 323. A rate of movement of actuator 120 and thereby camera mount 323 may be constant and/or variable. A camera mount may move with respect to a horizontal plane. A direction of movement of camera mount 323 with respect to a horizontal plane may range from a positive angle to a negative angle relative to the plane. A rate of movement of an actuator to position camera mount 323 parallel to a horizontal plane may correspond to a rate of movement of arm 110 along one or more axes relative to the horizontal plane.

In an implementation, actuator 220 couples to arm 210 at pivot 222. Actuator couples to camera head 232 at pivot 224. Actuator 220 may move (e.g., retract, extend). Actuator 220 may move camera head 230 around the axis of pivot 232. In an implementation, actuator 220 includes a linear actuator that extends and retracts to move camera head 230 around pivot 232. In another implementation, actuator 220 includes an electrical motor mounted to a distal end portion of arm 210. A rotor of the motor operates as the pivot that pivots camera head 230 with respect to arm 210. Actuator 220 may remain at a position (e.g., length, rotational position) to hold camera head 230 at a position. A position of actuator 220 may correspond to a position (e.g., inclination) of arm 210.

Actuator 220 may position camera head 230 with respect to arm 210. As discussed above, arm 210 may be positioned relative to a horizontal plane. Actuator 220 may position camera head 230 such that camera mount 232 of camera head 230 is parallel to the horizontal plane. As discussed above, an angle of inclination of arm 210 may be detected with respect to a horizontal plane and the angle of inclination may be used to move actuator 220 to position camera head 230 with respect to the horizontal plane. Actuator 220 may move camera head 230 so that camera mount 232 is parallel to the horizontal plane.

For example, the angle of inclination of arm 210 with respect to a horizontal plane may be used to determine (e.g., calculate) a length of actuator 220 to position camera mount 232 parallel to the horizontal plane. A change in the angle of inclination of arm 220 may result in a change in the length of actuator 220 to move and/or maintain the camera plane parallel to the horizontal plane.

Actuator 220 may move at a rate that is constant or variable. An angle of inclination of arm 210 may change at a rate that is constant or variable. A rate of change of movement of actuator 220 may correspond to a rate of change in the angle of inclination of arm 210. A correspondence between the rate of change in the angle of inclination of arm 210 and the rate of change in the movement of actuator 220 may include a relationship between the movement of actuator 220 and a rate of change in inclination of arm 210. A correspondence may include movement of actuator 220 at a fraction of the rate of change of the inclination of arm 210. A correspondence may include translating (e.g., converting) an angular movement of arm 210 into a linear movement of actuator 220.

An actuator may mechanically couple to arm 110 at a position that is offset from a centerline of arm 110. For example, centerline 502 of arm 210 is defined as a line between the center of pivot 244 and the center of pivot 232. Centerline 502 defines an angle of inclination of arm 210 with respect to a horizontal plane. In an implementation, actuator 220 pivotally couples to arm 210 at pivot 222. Because the axis of rotation of pivot 222 does not intersect centerline 502, actuator 220 is offset from centerline 502 of arm 210. An angle between centerline 502 and line 508 between pivot 222 and pivot 232 is offset angle 510. Offset angle 510 is also referred to herein as OFFSET.

An actuator may mechanically couple to camera head 130 along a centerline of camera head 130. For example, centerline 504 of camera head 230 is defined as a line between the axis of rotation of pivot 232 and the center of camera head 230. Actuator 220 pivotally couples to camera head 230 at pivot 224. In an implementation, the axis of rotation of pivot 224 is intersects centerline 504. Angle 520 is the angle between centerline 502 of arm 210 and centerline 504 of camera head 230.

In an implementation, the reference plane of arm 210 is defined as a horizontal plane. As discussed above, the angle of inclination of arm 210 is the angle between the horizontal plane and centerline 502. As further discussed above, the angle of inclination is referred to herein as angle 302 or THETA. While camera head 230 is positioned so that camera mount 232 is parallel to the horizontal plane, the magnitude of angle 520 is:

Magnitude of angle 520=90 degrees−THETA.

Angle 720 is defined as the angle between centerline 504 of camera head 230 and line 508. The magnitude of angle 720 is:

Magnitude of angle 720=90 degrees−THETA−OFFSET.

With respect to a horizontal plane, an angle of inclination 302 of arm 210 may range from a negative angle in which the proximate end portion of arm 210 is positioned higher than the distal end portion of arm 210 to a positive angle in which the proximate end portion of arm 210 is positioned lower than the distal end portion of arm 210. The maximum angle of inclination 302 of arm 210 is a function of the interference between counterweight 250 and base 240. The minimum angle of inclination 302 of arm 210 is a function of length 270 of arm 210, the height of base 240, the length of camera head 230, proximity of camera head 230 to an obstruction (e.g., ground), and the topography of the ground surrounding crane 200. Arm 210 reaches its minimum angle of inclination 302 when a portion of crane 200 (e.g., arm 210) interferes with base 240 or when camera head 230 contacts the ground.

As arm 210 moves from one inclination to another, the angle of inclination of arm 210 (angle 302, THETA) with respect to a horizontal plane may be used to calculate a length of actuator 220 to position camera mount 232 of camera head 230 parallel to the horizontal plane. Further, the rate of change in a length of actuator 220 may correspond to a rate of change of the angle of inclination of arm 210.

A control system according to various aspects of the present invention may detect movement of arm 110, detect a rate of movement of arm 110, control (e.g., direct, command, specify, actuate, regulate, coordinate) movement of actuator 120, establish a length of actuator 120, control movement of actuator 120 with respect to movement of arm 110, control movement of actuator 120 at a rate that corresponds to a rate of movement of arm 110, control movement of actuator 120 to move camera head 130, control movement of actuator 120 to move camera head 130 to correspond to movement of arm 110, control movement of actuator 120 so that the rate of movement of camera head 130 corresponds to a rate of movement of arm 110, control a length of actuator 120 to position camera mount 232 parallel to a plane, control movement of actuator 120 to maintain camera mount 232 parallel to a plane taking into account a rate and direction of movement of arm 110, detect an imbalance of arm 110 with respect to base 140, and control a position of counterweight 150 to decrease instability that may result from an imbalance.

For example, control system 100 may include processing circuit 170, memory 180, position detector 190, inclination detector 192, extension detector 194, and angular detector 196. Control system 100 may cooperate with crane 160 to perform the functions of a control system discussed herein.

A processing circuit performs one or more operations and/or controls performance of one or more operations of control system 100. A processing circuit may cooperate with a crane to control and/or provide information for control of the crane. Control of a crane may include moving, positioning, and/or orienting a crane. Control of a crane may include any of the operations performed by a crane as discussed above. Control system 100 may be a stand-alone system that cooperates with a system that regulates movement of a crane or a part of the system that regulates movement of the crane.

A processing circuit may be implemented with any conventional electronic devices and programs (e.g., firmware, software, code) for performing an operation and/or controlling an operation of control system and/or a crane. A processing circuit may include a conventional microprocessor that executes a stored program, logic gates, programmable logic gates, a signal processor, analog-to-digital converter, digital-to-analog converters, transducers, discrete transistors, and/or data buses. A processing circuit may include one or more microprocessors, microcontrollers, and/or signal processors. A processing circuit may cooperate with a memory to receive program instructions to perform an operation of the control circuit and/or crane. A processing circuit may receive information from and store information to a memory.

A program for a processing circuit may include object oriented programming (e.g., Java, Small Talk, C++), conventional procedural programming (e.g., C), lower-level code (e.g., assembly language, firmware, microcode), or any combination thereof. A program may execute entirely on a single processor and/or across multiple processors. A program may be a stand-alone program, part of a larger program, or one or more subroutines in a larger program.

A processing circuit may include interfaces (e.g., JO ports, busses, analog-to-digital converters, digital-to-analog converters, tri-state output drivers, sample-and-hold inputs, synchronous inputs, synchronous outputs, Schmitt trigger input, open drain output, CMOS output drivers, registered inputs, registered outputs, bi-directional ports, serial ports, parallel ports) for communicating with detectors and/or actuators of a crane. Communication may include providing information (e.g., signals, data, instructions, commands) to a detector and/or actuator. Signals may include analog and/or digital signals. Communication may include receiving information from a detector and/or an actuator. Information includes information provided in an analog form and/or in a digital form using any conventional analog and/or digital techniques for sending and/or receiving information. Information may be communicated in any conventional manner (e.g., wired, wireless) using any conventional protocol (e.g., USB, 1394, serial, parallel, IEEE 802.11) and/or technique (e.g., spread spectrum, encoded, encrypted, voltage, current, differential).

A memory may include any conventional storage device (e.g., Flash, RAM, ROM, optical, magnetic). A memory may receive information (e.g., data) for storage. A memory may provide access to information. A memory may provide access to information responsive to a request. A memory may store information permanently (e.g., non-volatile) and/or temporarily (e.g., volatile). A memory may store information in any conventional organization (e.g., bit, byte, word, row, column, array, database). A memory may provide information in any conventional organization. A memory may provide information in parallel and/or in serial. A memory may be integrated with another component of a processing circuit (e.g., microprocessor, microcontroller, signal processor).

A position detector may detect (e.g., discover, measure, sense) a position of an object. A position detector may detect a position of an object relative to a reference point (e.g., location in a coordinate system). A position detector may detect a position of an object relative to another object. A position detector may include any conventional device (e.g., incremental encoders, absolute encoders, resolvers, potentiometers, string potentiometers, tachometers, torque motors, servo motors, range detectors) for detecting a position of an object using any conventional method (e.g., rotational, linear, time of flight, triangulation, multiple frequency phase-shift, coincident, parallax).

A position detector may provide position information as distance information. Distance information may include a distance to a references point and/or a distance and direction to a reference point. Distance information may be provided in any conventional manner (e.g., voltage, current, digital value, packet). A position detector may provide distance information at a frequency (e.g., continuous, discrete times). A position detector may provide distance information to a processing circuit. A processing circuit may request position information from a position detector. A position detector may detect a position with a resolution (e.g., granularity of measurement) suitable for the application.

For example, a position detector may detect a position of counterweight 250 with respect to pivot 244. In an implementation, position detector 190 detects distance 260 between pivot 244 and counterweight 250. Distance 260 defines the position of counterweight 250 with respect to pivot 244 along track 252.

An extension detector may perform the functions of a position detector as discussed above. An extension detector may detect an extension and/or retraction of an object. A present position of an object or a portion of an object may be used to determine an extension and/or retraction of an object. An extension detector may detect a length of an object.

For example, an extension detector may detect an extension of arm 210 by detecting length 270 of arm 210. Length 270 may be detected by detecting a distance between a distal end portion of arm 210 and an axis of rotation of pivot 244. An extension detector may detect an extension of section 214 of arm 210 from section 212 of arm 210 and/or an extension of section 216 from section 214. The extension of section 214 from section 212 and 216 from 214 may be detected as length 274 and length 272 respectively. Length 274 may be detected by detecting a distance between a portion of section 212 (e.g., a distal end portion) and a portion of section 214 (e.g., a distal end portion. Length 272 may be detected by detecting a distance between a portion of section 214 (e.g., a distal end portion) and a portion of section 216 (e.g., a distal end portion).

An inclination detector detects a deviation from a reference. An inclination detector may detect a deviation from one or more references. A reference may include a reference oriented in any direction (e.g., horizontal, vertical, x, y, z). A reference may include a horizontal plane oriented perpendicular to a direction of gravity. A deviation from a reference plane may include an angle of inclination from the plane. An angle of inclination may indicate a deviation above or below the plane. An angle of no inclination (e.g., zero) may indicate no deviation from (e.g., parallel with) the reference plane. An inclination detector may include any conventional inclination detector (e.g., inclinometer, tilt sensor, mechanical tilt sensor, MEMS, gyroscope, accelerometer, mercury switch, magnetic, incremental, absolute).

An inclination detector may provide information as to an amount of deviation from a reference. An amount of deviation may include an angle of inclination. An inclination detector may provide information in any conventional manner (e.g., voltage, current, digital value, packet). An inclination detector may provide information at a frequency (e.g., continuous, discrete times). An inclination detector may provide information to a processing circuit. An inclination detector may detect an inclination with a resolution suitable for the application.

For example, an inclination detector may detect an angle (e.g., THETA, 302) between a horizontal plane and centerline 502 of arm 210 of crane 200. A value of the angle my range from a negative value (e.g., distal end portion of arm 210 oriented downward with respect to the horizontal plane) and a positive value (e.g., distal end portion of arm 210 oriented upward with respect to the horizontal plane).

An angular detector may detect an angular difference in a position of a first object with respect to a second object. An angular detector may detect an angle of orientation of a first object with respect to a second object. An angular detector may detect a difference in an angle of orientation between a first object and a second object. An angular detector may detect an angle between two objects in a plane. A plane may be oriented in any direction (e.g., x, y, z, horizontal, vertical). An angular detector may detect an angular difference in one or more planes. An angular detector may detect an amount of rotation around one or more axes (e.g., x, y, z).

An angular detector may provide information regarding a detected angle. Information may be provided in any conventional manner (e.g., voltage, current, digital value, packet). An angular detector may provide information at a frequency (e.g., continuous, discrete times). An angular detector may provide information to a processing circuit. An angular detector may provide information regarding an angle between two objects at a frequency sufficient for a processing circuit to determine a rate of change of the angle between the two objects. A rate of change calculated by a processing circuit using information from an angular detector may be used to control a rate of movement of another device (e.g., an actuator). An angular detector may detect an angle with a resolution suitable for the application. An angular detector may detect an angle and provide information to a processing circuit with a resolution suitable for the application.

An angular detector may include any conventional device (e.g., rotary position sensor, potentiometer, rotary encoder, magnetic, incremental, absolute, magnetostrictive, angular encoder) that detects an angle between two objects and/or an amount of rotation around an axis.

For example, an angular detector detects movements of arm 210 with respect to base 240 around pivot 244. In one implementation, an incremental rotary encoder detects rotations of arm 210 around pivot 244. The rotary encoder provides rotation information to processing circuit 170.

A processing circuit may receive information from detectors. A processing circuit may perform calculations using information provided by detectors. A processing circuit may use information from detectors and information derived from calculations and/or algorithms to provide information to control a position, movement, and/or a rate of movement of a component of crane 160. A component of crane 160 may include any portion of crane 160 discussed above.

A processing circuit may provide a report of information received from a detector. A processing circuit may provide a report of calculated and/or derived information. A processing circuit may provide a report of information provided to control one or more components of a crane. A processing circuit may create a log of received, calculated, and/or derived information. A processing circuit may create a log of information provided to control a component of a crane.

In an implementation, according to various aspects of the present invention, processing circuit 170 receives inclination information regarding an inclination of arm 110 from inclination detector 192. Processing circuit 170 executes "inclination to actuator position algorithm" 182 to use information from inclination detector 192 to determine a position (e.g., length) of actuator 220 to position camera head 230 so that camera mount 232 is parallel to the plane of references of inclination detector 192. In an implementation, the plane of reference of inclination detector 192 is the horizontal plane.

In an implementation, algorithm 182 receives a value of a present inclination (e.g., angle 302, THETA) of arm 210 of crane 200 and determines a length of a linear (e.g., screw) actuator 220 to maintain camera mount 232 parallel with the reference plane of inclination detector 192. Algorithm 192 uses known information about crane 200 along with the angle of inclination of arm 210 to determine a length of actuator 220.

Algorithm 182 may include process 902: receive magnitude of inclination of arm (THETA); process 904: calculate length A2; process 906: calculate length C; and process 908: calculate length X of linear actuator. Information about the variables (e.g., symbols) and constants (e.g., known quantities) of algorithm 182 and FIGS. 2-12 are discussed below.

THETA. An angle between centerline 502 of arm 210 and the horizontal plane ("HP"). In an implementation, inclination detector 192 detects the magnitude of the angle THETA with respect to a plane perpendicular to a direction of gravity referred to herein as a horizontal plane.

X: a length of actuator 220. The magnitude of the length of X is calculated to position centerline 504 of camera head 230 oriented parallel to a direction of gravity (e.g., perpendicular to the horizontal plane) so that camera mount 232 is positioned substantially parallel to the horizontal plane. Algorithm 182 calculates the magnitude of the length of X with respect to a magnitude of the angle THETA. In an implementation, the length X is measured from the axis of rotation of pivot 222 to the axis of rotation of pivot 224.

A. A distance between the axis of rotation of pivot 232 and the axis of rotation of pivot 224 along camera head 230. The axis of rotation of pivot 232 intersects centerline 502 of arm 210 and centerline 504 of camera head 230. The magnitude of distance A is constant. In an implementation, the magnitude of distance A is about 7.5 inches.

B. A distance between the axis of rotation of pivot 232 and the axis of rotation of pivot 222. The axis of rotation of pivot 232 intersects centerline 502 of arm 210. The magnitude of distance B is constant. In an implementation, the magnitude of distance B is about 26.137 inches.

C. A distance between the axis of rotation of pivot 222 and centerline 504. Line C is used to calculate a magnitude of the length of X. Line C is defined as being perpendicular to center line 504 (e.g., camera head 230) regardless of the magnitude of THETA.

A2. A distance used to determine the length of the side of the triangle opposite angle 730.

A3. A distance between the axis of rotation of pivot 232 and line C. The magnitude of the length of A3=A+A2. Line A3 is the side of the triangle opposite angle 730. Line A3 is perpendicular to line C.

OFFSET (510). A magnitude of an angle between line 508 and centerline 502 of arm 210. The magnitude of the angle of OFFSET is constant. In an implementation, the magnitude of the angle of OFFSET is about 10.06192331 degrees.

Angle 520. Angle 520 is discussed above. The magnitude of angle 520=90 degrees−THETA.

Angle 720. Angle 720 is discussed above. The magnitude of angle 720=90 degrees−THETA−OFFSET.

Angle 730. Angle 730 is the angle between line B and line C. The magnitude of angle 730=THETA+OFFSET. The rules of geometry show that angle 730=90 degrees−angle 720, so angle 730=90 degrees−(90 degrees−THETA−OFFSET)=THETA+OFFSET.

Figure 9:
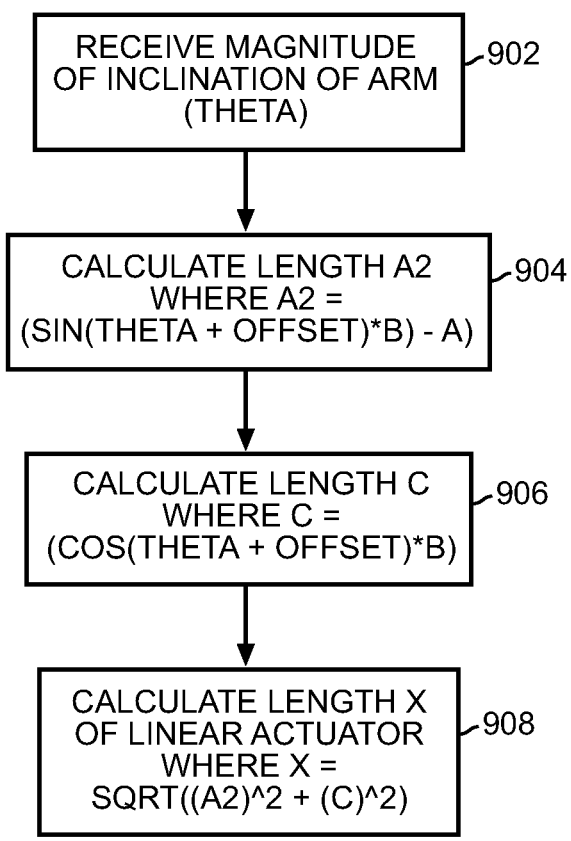
FIG. 9 is a flow diagram of an algorithm for determining a length of an actuator responsive to an angle of inclination of an arm of a crane according to various aspects of the present invention.
Figure 10:
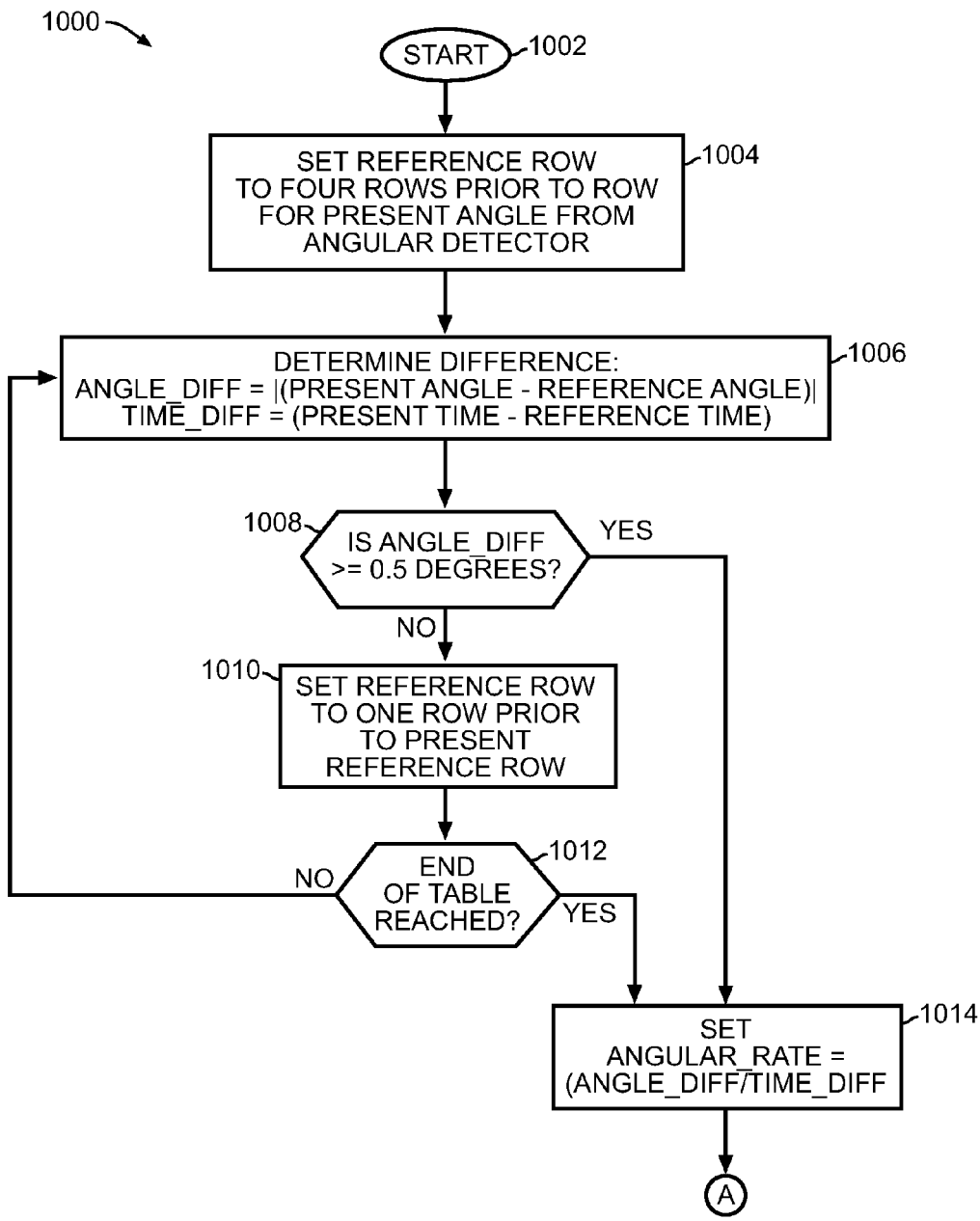
FIG. 10 is a flow diagram of an algorithm for determining an angular rate of change of an arm of a crane according to various aspects of the present invention.

The distances and angles discussed above are used to calculate a magnitude of the length X as follows and as shown in FIG. 9.

$$\sin(\text{THETA}+\text{OFFSET})=A3/B=(A+A2)/B \quad \text{Equation 1:}$$

Equation 1 is the definition of the sine function. The line A3 is opposite angle 730 as discussed above and shown in FIGS. 7-8. Line B is the hypotenuse of the triangle formed by lines B, C, and A3. As discussed above, a magnitude of the length of A3=(A+A2), which may be substituted into Equation 1.

$$A2=(\sin(\text{THETA}+\text{OFFSET})*B)-A \quad \text{Equation 2:}$$

Equation 1 may be rearranged to solve for A2 as shown in Equation 2. As discussed above, line C is perpendicular to center line 504, so line C is also perpendicular to the A3 portion of the line between pivot 232 and pivot 224. As discussed above, the magnitude of the lengths of line B and line A and the magnitude of the angle OFFSET are constant. Inclination detector 192 provides the magnitude of the angle THETA, so the value for A2 may be calculated using the known values for A, B, and THETA. Process 904 of algorithm 182 determines the magnitude of the length of A2 in accordance with Equation 2.

$$\cos(\text{THETA}+\text{OFFSET})=C/B \quad \text{Equation 3:}$$

Equation 3 is the definition of the cosine function. As discussed above, line B is the hypotenuse of the triangle formed by lines B, C, and A3.

$$C=\cos(\text{THETA}+\text{OFFSET})*B \quad \text{Equation 4:}$$

Equation 3 may be rearranged to solve for C as shown in Equation 4. As discussed above, line C is perpendicular to center line 504 and line A3. As discussed above, the magnitude of the length of line B and the angle OFFSET are constant and known. Inclination detector 192 provides a magnitude of the value of the angle THETA, so the magnitude of the length of C may be calculated using the known values for A2 and B. Process 906 of algorithm 182 determines the magnitude of the length of C in accordance with Equation 4.

$$X=\sqrt{(A2)^2+(C)^2} \quad \text{Equation 5:}$$

Because line A2 and C are defined as being perpendicular to each other and because lines A2, B, and C thereby form a right triangle, the Pythagorean Theorem may be used to solve for the magnitude of the length of X. As discussed above, X represents the length of actuator 220 to keep centerline 504 of camera head 230 parallel to the direction of gravity and camera mount 232 parallel to the horizontal plane. Process 908 of algorithm 182 determines the magnitude of the length of X in accordance with Equation 5.

Figure 7:
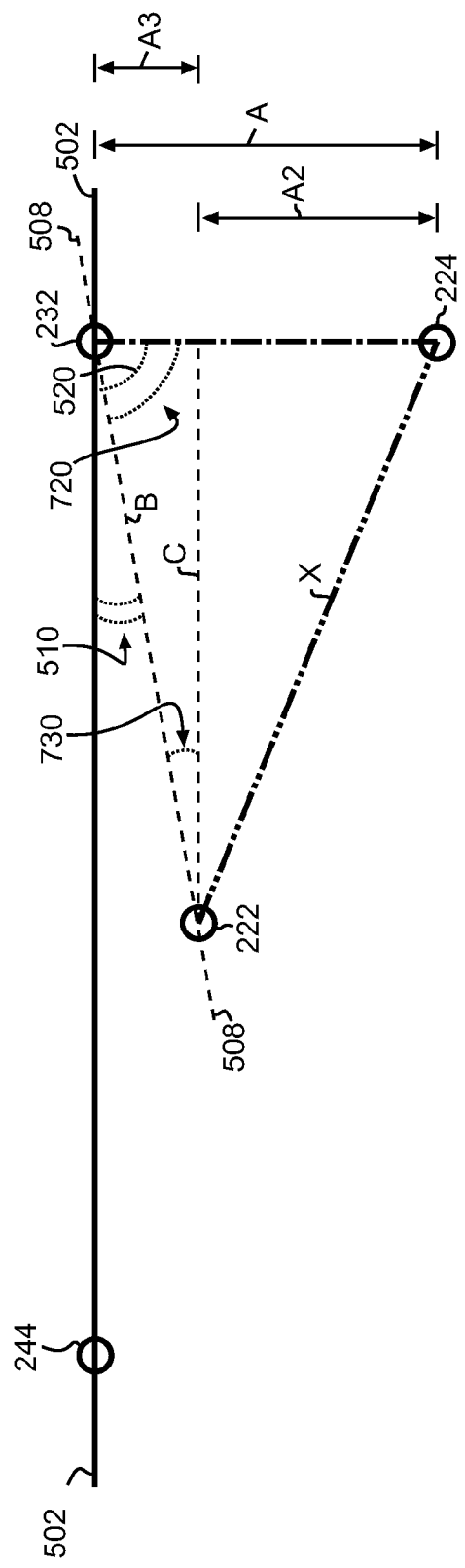
Figure 8:
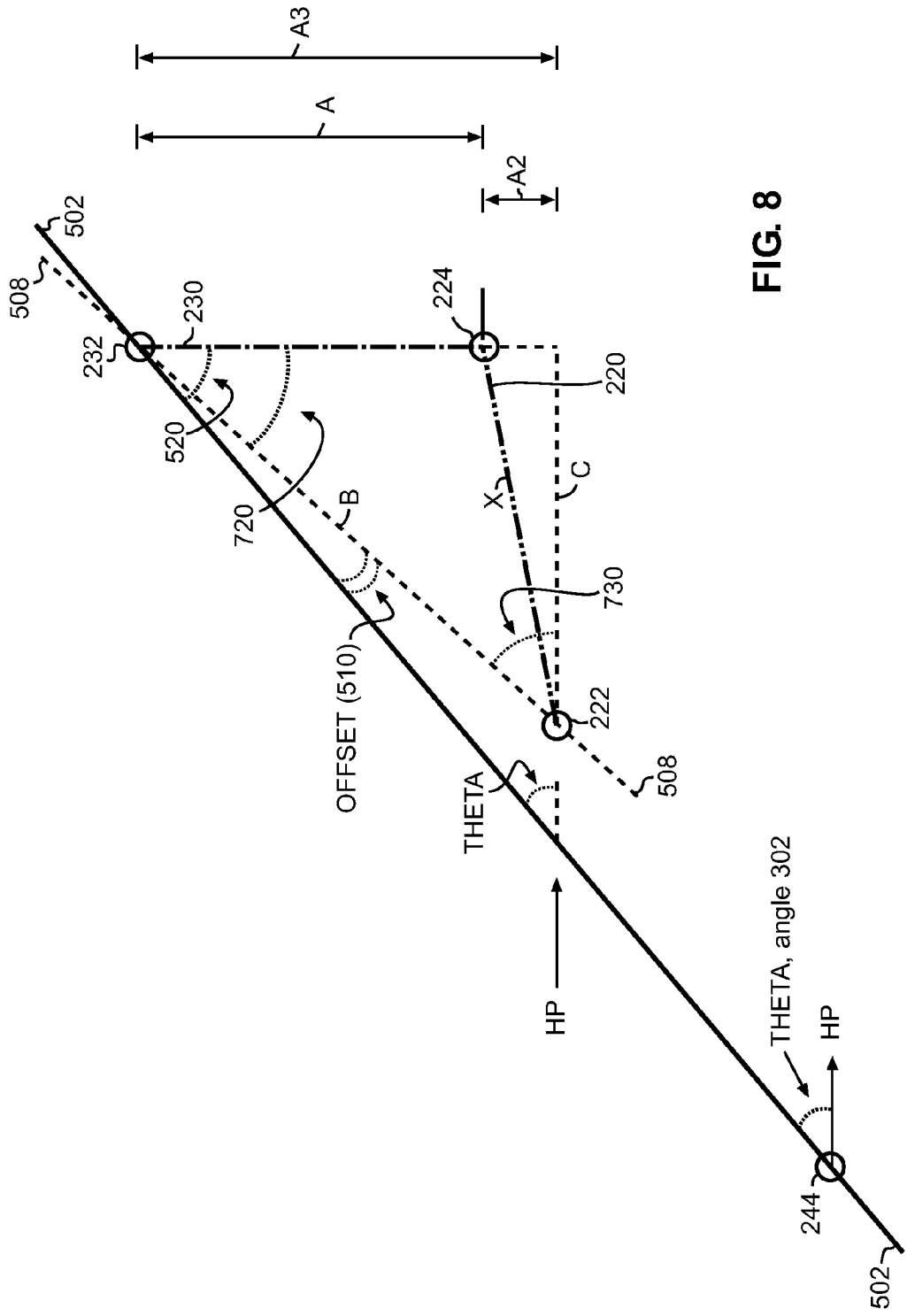

FIG. 7 shows the above variables and constants for a magnitude of the angle THETA equal to zero degrees while FIG. 8 shows the variables and constants for a magnitude of the angle THETA greater than zero, but less than 90 degrees. The magnitude of the angle THETA may further be less than zero degrees. The magnitude of THETA is limited by the range of movement of arm 210 around pivot 244 as discussed above.

In an implementation, inclination detector 192 provides a magnitude of the angle THETA to processing unit 170 (e.g., process 902). Processing unit 170 uses the values and formulas in accordance with algorithm 182 to determine the magnitude of length of linear actuator 220 to position camera mount 232 parallel to the horizontal plane.

Upon determining a magnitude of X, processing unit 170 provides instructions to actuator 220 to move from its current position to a position that results in the magnitude of the length of actuator 220 being the value of X. As discussed herein, the length of actuator 220 may change from its current length to the length X at a rate that corresponds to a rate of change of the angle of inclination of arm 210.

In an implementation, processing circuit 170 receives a magnitude of the angle THETA every 2 ms. The present position (e.g., length) of actuator 220 is always known (e.g., absolute actuator, or relative actuator plus position storage). Actuator 220 may provide its present position to processing circuit 170. In one implementation, processing circuit 170 receives the present position of actuator 220 at initialization. Using the present position of actuator 220 and the present magnitude of angle THETA, processing circuit 170 may determine the distance to move actuator 220. In an implementation, processing circuit 170 may update the amount that actuator 220 moves every 2 ms; however, as discussed herein, the length of actuator 220 may change at a rate that that corresponds to a rate of change in the angle of inclination of arm 210, so the length of actuator 220 may not be move to the calculated length X every 2 ms. The rate of change in the length of actuator 220 is discussed below.

Actuator 120 may include linear or rotary actuators. Processing circuit 170 may use the present magnitude of angle THETA and the present position of actuator 120 to determine how far actuator 120 must move regardless of whether the actuator is linear or rotary.

The rate of changing length X of actuator 220 may correspond to a rate of change of the magnitude of the angle of inclination of arm 210. In an implementation, algorithm 184 determines a rate of change of the magnitude of the angle detected by angular detector 196 and provides information so that a change in the length X of actuator 220 occurs at a corresponding rate.

In an implementation, algorithm 184 includes algorithm 1000 for determining an angular rate of change ("angular_rate") in the inclination of arm 210 and algorithm 1100 for converting the angular rate of change of arm 210 into a linear rate of change ("linear_rate") of actuator 220.

In an implementation, angular detector 196 includes a rotary encoder that detects the angular position of arm 210 at pivot 244. Because the magnitude of the angle provided by the rotary encoder is used to determine a rate of change as opposed to the position of arm 210, the rotary encoder does not need to provide an angle with respect to a reference plane as does inclination detector 192. The rotary encoder need only provide relative positions.

The rotary encoder provides angle information to processing circuit 170. Processing circuit 170 stores in memory 180 the angle information with the time at which arm 210 is positioned at the reported angle. In one implementation processing circuit 170 receives a magnitude of the angle of arm 210 every 10 milliseconds. Processing circuit stores the magnitude of the angle in a table in memory 180, but does not store time information because each entry in the table represents 10 ms. In another implementation, processing circuit 170 does not receive angle information at regular 10 ms intervals, so processing circuit 170 stores the angle and the time corresponding to the angle in a table in memory 180. Table 1 below represents the magnitude of the angle of arm 210 every 10 ms.

Once processing circuit 170 has stored a value in every table entry (e.g., row), processor 170 may wrap around (e.g., circular list) to the start of Table 1 to store new values thereby overwriting old values. Processing circuit may use conventional pointers to track the most recent entry (e.g., start of list) and the last valid entry (e.g., end of list). In Table 1, entry no. 0 is the last (e.g., oldest) valid entry. Entry no. 31 is the most recent entry and thereby corresponds to the present angle provided by angular detector 196. In one implementation, the number of entries in a table for storing angle and time information is 32. In another implementation, the number of entries in a table is 20.

TABLE 1

Values from Rotational Encoder

| Entry | Encoder Angle |
|---|---|
| 0 | 20.000000 |
| 1 | 20.000000 |
| 2 | 20.000000 |
| 3 | 20.125000 |
| 4 | 20.275000 |
| 5 | 20.450000 |
| 6 | 20.650000 |
| 7 | 20.875000 |
| 8 | 21.125000 |
| 9 | 21.375000 |
| 10 | 21.500000 |
| 11 | 21.562500 |
| 12 | 21.593750 |
| 13 | 21.609375 |
| 14 | 21.615688 |
| 15 | 21.620500 |
| 16 | 21.625313 |
| 17 | 21.630125 |
| 18 | 21.637938 |
| 19 | 21.645750 |
| 20 | 21.653563 |
| 21 | 21.661375 |
| 22 | 21.669188 |
| 23 | 21.675688 |
| 24 | 21.680688 |
| 25 | 21.681438 |
| 26 | 21.681388 |
| 27 | 21.681038 |
| 28 | 21.680688 |
| 29 | 21.680338 |
| 30 | 21.679988 |
| 31 | 21.679638 |

In an implementation, processing circuit 170 performs calculations on the information provided by angular detector 196 to determine whether the change in the angle of arm 210 is greater than a threshold angle. Upon detecting a change in angle greater than a threshold, processing circuit 170 determines an angular rate of change. In an implementation, the threshold angle is about 0.5 degrees. In an implementation, the absolute value of a change in the angle of arm 210 is compared to a threshold angle.

As processing circuit 170 receives angle information, processing circuit 170 may detect a change in the angle of arm 210 by subtracting the value of an earlier detected angle from the value of a more recently detected angle. Upon detecting a change in the angle of arm 210 greater than a threshold angle, processing circuit 170 may calculate an angular rate of change of arm 210 by subtracting the value of the earlier detected angle from the value of the more recently detected angle and dividing the difference by the time between receiving the angle information.

For example, the absolute value of the magnitude of change in the angle between entries 31 and 30 is 0.00035 degrees, which is less than a threshold angle of 0.5 degrees. The absolute value of the magnitude of change in the angle between entries 31 and 8 is 0.5546375 degrees, which is greater than a threshold of 0.5 degrees. The rate of angular change between entries 31 and 8 is (21.679638 degrees– 21.125 degrees)/(23 entries*0.01 s/entry)=2.411468 degrees/second.

In an implementation, algorithm 1000 determines an absolute value of the magnitude of change in the angle of inclination of arm 210 and a rate of change of the angle of inclination of arm 210. Algorithm 1000 includes process 1002: start; process 1004: set reference row; process 1006: determine angle_diff and time_diff; process 1008: angle_diff>=0.5 degrees?; process 1010: set reference row; process 1012: end of table?; process 1014: set angular_rate.

Each time processing circuit 170 executes algorithm 184, processing circuit 170 begins execution at process 1002.

Process 1004 sets a reference row. The present magnitude of the angle of inclination is the most recent angle reported by angular detector 196. In the present example, the most recent angle of inclination is stored in row 31 of Table 1. Process 1004 sets the reference row to four rows before the row of the present angle. In the example of Table 1, the present angle reported by angular detector is stored in row 31, so process 1004 sets the reference row to row no. 27.

Process 1006 calculates the absolute value of the difference (e.g., angle_diff) in the magnitude of present angle and the magnitude of the angle of the reference row. Process 1006 further calculates the difference in time (e.g., diff_time) between when arm 210 was positioned at the present angle and when arm 210 was positioned at the angle of the reference row.

Process 1008 detects whether the absolute value of the difference in angle (e.g., angle_diff) is greater than or equal to the threshold angle of 0.5 degrees. If the angle_diff is greater than or equal to 0.5 degrees, execution of algorithm 1000 continues with process 1014. If the angle_diff is less 0.5 degrees, execution of algorithm 1000 continues with process 1010. In the present example, the absolute value of the difference between row 31 and 27 is 0.00395 degrees, so execution moves to process 1010.

Process 1010 sets the reference row to a row that is one position in the table prior to the present reference row. In this example, the first execution of process 1012 sets the reference row to be row no. 26, from row no. 27.

Process 1012 determines whether the reference row has reached the end of the table. With respect to Table 1 in the present example, when the references row is set to row 0, the end of the table has been reached. Once the end of the table is reached, execution passes to process 1014. If the end of the table has not been reached, control passes to process 1006 to determine a value for angle_diff and time_diff for the new reference row.

In the present example, processes 1006, 1008, 1010, and 1012 are repeatedly performed because the absolute value of the difference in angle is less than 0.5 degrees until reference row is set to row no. 8 as discussed above. When reference row is set to row no. 8, angle_diff is greater than 0.5 degrees, so execution moves to process 1014.

In the event that processes 1006, 1008, 1010, and 1012 are repeatedly executed until the last row becomes the reference row, the angular rate for arm 210 is set in process 1016.

Once the absolute value of the difference in angle is determined to be greater than or equal to 0.5 degrees or all entries in the table have been tested, process 1014 is executed to determine the angular rate of movement of arm 210. The angular rate is determined by dividing the difference in angles by the difference in time of the angles. In the present example, magnitude of the angle of row 8 is subtracted from the magnitude of the angle of row 31 and divided by the difference in time between row no. 31 and 8. In this example and as discussed above, process 1014 sets angular_rate to 2.411468 degrees/second.

Having determined a distance to move actuator 220 (algorithm 182) and a rate of change in the angle inclination of arm 210 (algorithm 1000), processing circuit 170 in accordance with algorithm 1100 of algorithm 184 determines a rate to move actuator 220 to maintain a correspondence between the rate of movement of camera head 230 and a rate of angular movement of arm 210. Maintaining a correspondence between the rate of change of actuator 220 and the rate of change of arm 210 moves camera head 230 so that camera mount 232 is generally parallel to the horizontal plane with smooth movements. Smooth movement includes decreasing sudden accelerations/decelerations, decreasing jerking (e.g., stops, starts) movements, and reducing disruptions in the quality of the image captured by the camera. Smooth movement results in higher picture quality captured by camera 234.

A correspondence between the rate of movement of arm 210 and the rate of movement of actuator 220 may be linear or non-linear. A correspondence may be determined each time (e.g., every 2 ms) processing circuit 170 receives an angle of inclination from inclination detector 192, each time (e.g., every 2 ms) processing circuit 170 calculates a length of actuator 220, and/or each time (e.g., every 10 ms) processing circuit 170 calculates a rate of angular change of arm 210 using information provided by angular detector 196.

In an implementation for determining a linear rate of movement of actuator 220 that corresponds to an angular rate of movement of arm 210 as detected by angular detector 196, algorithm 1100 of algorithm 184 includes process 1102: set THETA; process 1104: determine length; process 1106: determine scalar; process 1108: determine linear rate; process 1110: compare linear rate to threshold; process 1112: set minimum rate; and process 1020: end.

During execution of process 1102, processing circuit 170 receives a magnitude of the inclination of arm 210, THETA_0, from inclination detector 192. In parallel, processing circuit 170 may also receive one or more magnitudes of angles of arm 210 from angular detector 196 for storage in memory 180. As discussed above, information from angular detector 196 is used to determine a rate of angular change of arm 210 while information from inclination detector 192 is used to determine an angle of inclination of arm 210 and a length of actuator 220.

Although both inclination detector 192 and angular detector 196 both detect an inclination of arm 210, inclination detector 192 detects an angle of inclination relative to the horizontal plane. Angular detector 196 detects an angle of inclination relative to a previously detected angle.

In an implementation, processing circuit 170 receives information from inclination detector 192 every 2 ms and information from angular detector 196 every 10 ms. Because the update rate of the inclination detector 192 is higher than the update rate of angular detector 196, information used to calculate angular rate of change may not be as recent as inclination information, but the update rate for angular detector 196 is sufficiently frequent for calculating angular rate of change.

Upon receiving the present inclination of arm 210 from inclination detector 192 (e.g., THETA_0), process 1102 calculates a value THETA_1. The value of THETA_1 is the present value of the inclination of arm 210 plus an incremental value (DELTA). In one implementation, the incremental value is 0.01 degrees.

Figure 11:
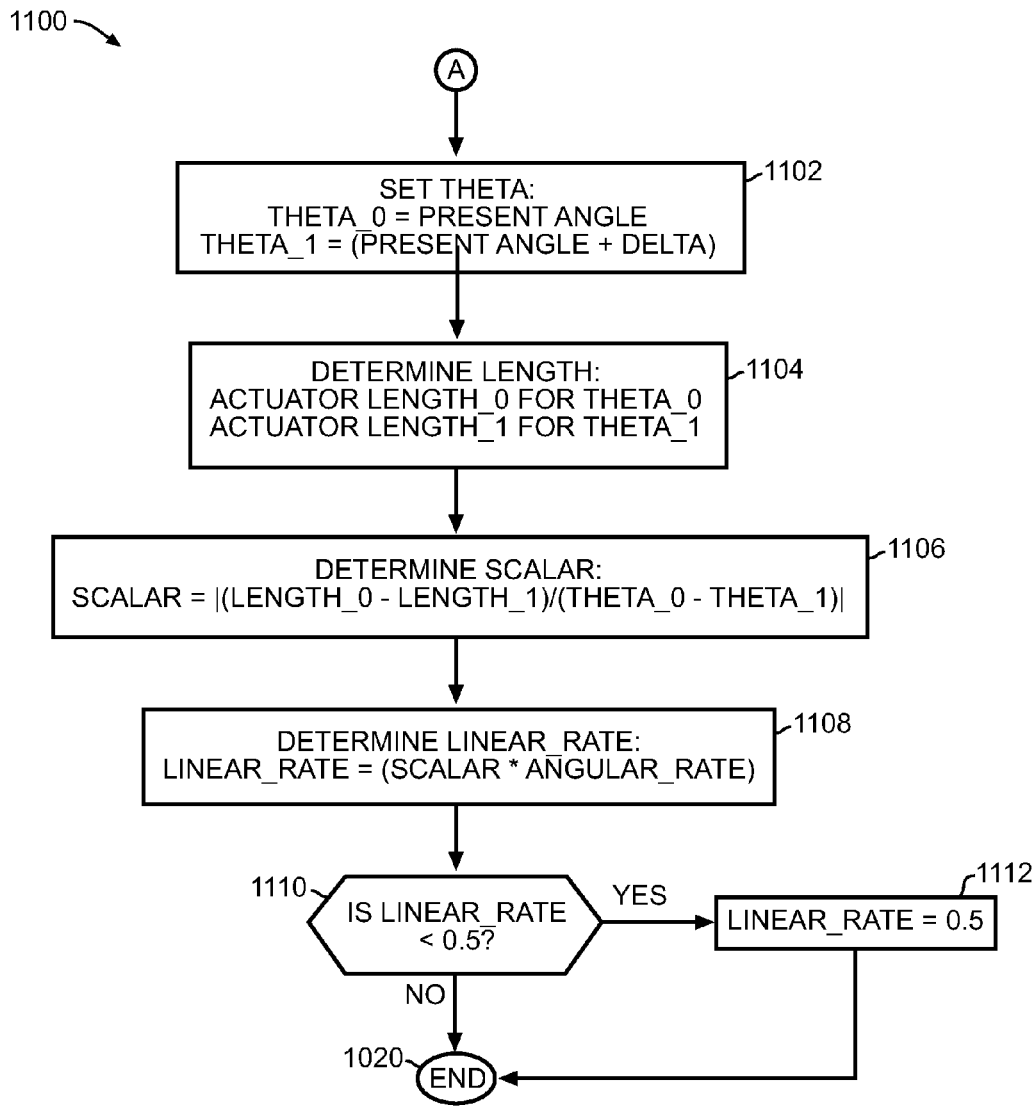
FIG. 11 is a flow diagram of an algorithm for determining an linear rate of change of an actuator according to various aspects of the present invention.
Figure 12:
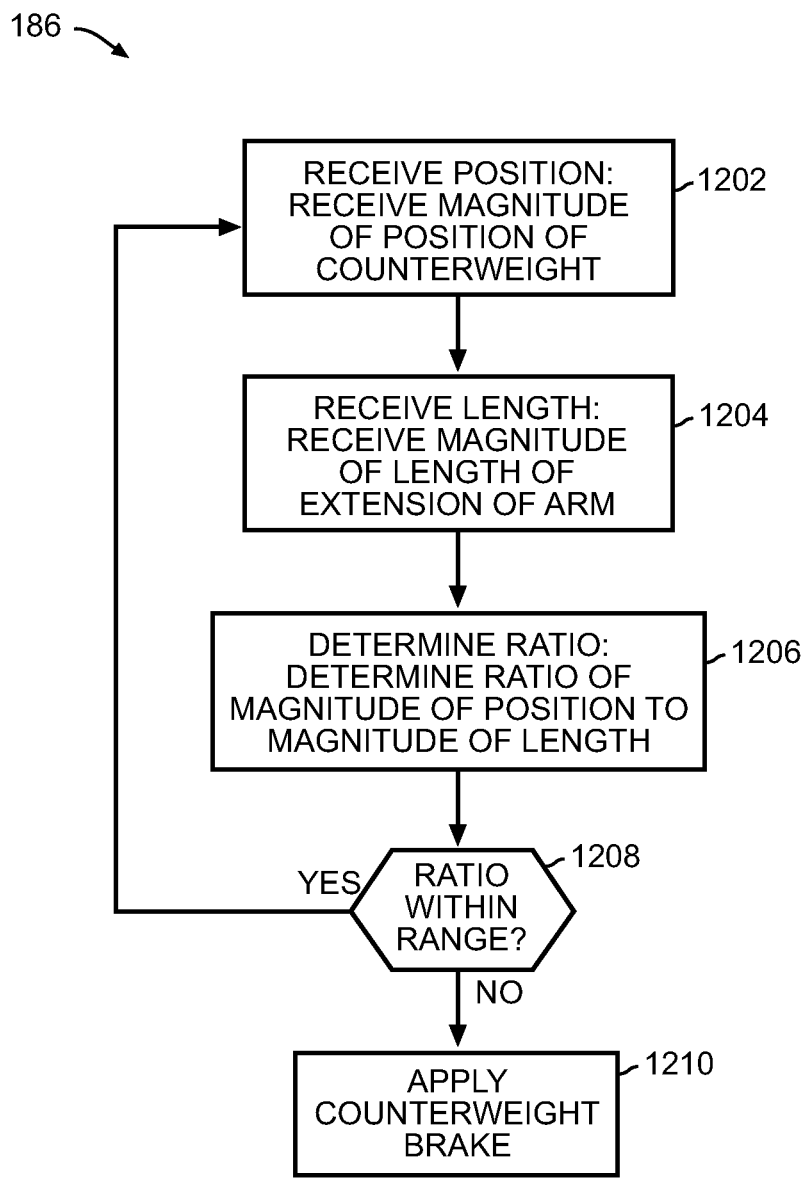
FIG. 12 is a flow diagram of an algorithm for monitoring a position of a counterweight and a length of extension of an arm according to various aspects of the present invention.

During execution of process 1104, processing circuit 170 determines the length of actuator 220, actuator LENGHT_0 and actuator LENGTH_1, for THETA_0 and THETA_1 respectively. Actuator LENGTH_1 represents the length of actuator 220 for a projected change in THETA of DELTA (e.g., 0.01 degrees). Once LENGTH_0 and LENGTH_1 are calculated, processing circuit 170 executes process 1106 to determine a value SCALAR. SCALAR, as shown in FIG. 11, is calculated as:

SCALAR=|(LENGTH_0−LENGTH_1)/(THETA_0−THETA_1)|

Processing circuit 170 executes process 1108 to convert SCALAR into a linear rate of change for actuator 220 that corresponds to the angular rate of change of arm 210. The linear rate is calculated by multiplying SCALAR by ANGULAR RATE as determined by process 1000. The equation for LINEAR_RATE is:

LINEAR_RATE=(SCALAR)*(ANGULAR RATE)

Execution of process 1110 compares the linear rate to a threshold linear rate. In one implementation, the threshold linear rate is 0.5 inches/second. In another implementation, the threshold is less than or greater than 0.5 inches/second.

If linear rate is greater than 0.5 inches/second, execution moves to process 1020 where the present execution of the algorithm terminates. If linear rate is less than 0.5 inches/second, execution moves to process 1112 where the linear rate is set to a minimum linear rate of 0.5 inches/second.

The thresholds and minimum values used in algorithms 182, 184, and/or 186 may be increased or decrease to achieve a desired performance of movement of the arm of a crane. Performance of movement may include moving the arm of the crane and/or the camera head in such a manner as to not disrupt filming by a camera attached to the camera head.

Having determined a linear rate for moving actuator 220, processing circuit 170 may provide information to actuator 220 to move actuator 220 at the calculated rate until the rate is updated by a subsequent execution of algorithm 184 and/or the desired length of actuator 220 is reached. In an implementation, processing circuit performs algorithm 184 every 2 ms to determine a magnitude of LINEAR_RATE.

For example, using the values provided in Table 1 as the values reported by angular detector 196, processing circuit 170 executes algorithm 1000 as discussed above to calculate a rate of angular change of 2.411468 degrees/second. Prior to executing process 1102 of algorithm 1100, processing circuit receives a magnitude of the present inclination (THETA) of arm 210 from inclination detector 192. In this example, the present angle of inclination of arm 210 as provided by inclination detector 192 is 21.283989 degrees. Note that the value for the angle of inclination provided by inclination detector 192 and angular detector 196 is not the same.

Because information provided by inclination detector 192 is used to determine the angle of inclination of arm 210 and the length of actuator 220 and the information provided by angular detector 196 is used to determine a rate of change, the values provided by inclination detector 192 and angular detector 196 may not be the same. Information provided by inclination detector 192 is oriented to the horizontal plane and is used to orient camera head 230 to the horizontal plane. Information from angular detector 196 may or may not be oriented to the horizontal plane. Information from angular detector 196 may be used to detect relative movements of arm 210.

In one implementation, angular detector 196 provides information having a higher granularity (e.g., resolution) than inclination detector 192. In another implementation, at system initialization, information from inclination detector 192 is used to initialize angular detector 196 to reference angular detector 196 to the horizontal plane. After initialization, information provide by angular detector 196 may be used to for both determining the length of actuator 220 and a rate of angular change of arm 210.

Continuing with the above example, the magnitude of THETA_0 is 21.283989 degrees. The delta change is 0.01 degrees, so the magnitude of THETA_1 is 21.292989 degrees. The length of B is 26.137 inches, A is 7.5 inches, and offset is 10.0619 degrees. Using the formulas discussed above to calculate the length X for actuator 220, LENGTH_0=23.13967006 inches and LENGTH_1=23.13840735 inches. The value for SCALAR is the absolute value of the difference in length divided by the difference in angle. For this example, SCALAR is calculated to be (|23.13967006 inches−23.13840735 inches|)/(0.01 degrees)=0.126271496 inches/degree. Multiplying the angular_rate calculated in algorithm 1000 by SCALAR provides LINEAR_RATE=(0.126271496 inches/degree)*(2.411468 degrees/second)=0.304499596 inches/second.

The magnitude of the linear rate of change of the actuator provides a rate of change and not a direction of change. The direction of change is determined by whether the length of the actuator with respect to the angle of inclination should be increased or decreased.

According to various aspects of the present invention, processing circuit 170 may use "counterweight to extension algorithm" 186 to detect a correspondence between a position of counterweight 250 and a magnitude of a length of extension of arm 210. A correspondence may include a ratio between a distance of counterweight 250 away from an axis of rotation of pivot 224 and a magnitude of a length of extension of one or more segments (e.g., 214, 216) of arm 210.

In an implementation, algorithm 186 includes process 1202: receive position; process 1204: receive length; process 1206: determine ratio; process 1208: ratio range; and process 1210: apply break.

In process 1202, processing circuit 170 receives a magnitude of the position of counterweight 250. As discussed above, the position of counterweight 250 may be a distance from base 240, pivot 244, or some other portion of crane 200. Processing circuit 170 may receive information from a detector to receive the magnitude of the position of counterweight 250. In an implementation, processing circuit 170 receives information from a string potentiometer that measures distance 260 from a position proximate to pivot 244 to counterweight 250. The string potentiometer provides an analog signal proportional to a length of the string that extends from the string potentiometer.

In process 1204, processing circuit 170 receives a magnitude of the length of extension 274 of segment 214 of arm 210. The length of extension 274 may be a distance from a distal end of segment 212 to a distal end of arm 214. Processing circuit 170 may receive information from a detector to receive the magnitude of the length of extension 274. In an implementation, processing circuit 170 receives information from a string potentiometer that measures the distance from a distal end portion of segment 212 of arm 210 to a distal end portion of segment 214. The string potentiometer provides an analog signal proportional to a length of extension 274.

In process 1206, processing circuit 170 may determine a ratio of distance 260 to length 274.

In process 1208, processing circuit 170 may compare the ratio to a range. A ratio within the range may indicate proper movement of counterweight 250 with respect to extension of arm 210. A ratio outside the range may indicate that distance 260 and/or movement of counterweight 250 with respect to length 274 and/or movement of arm 210 may result in an imbalance. A mechanical failure (e.g., severed cable) in controlling the movement and/or position of counterweight 250 and/or segment 214 of crane 200 may result in a ratio that is not within the range.

Upon detecting a ratio outside the range, processing circuit 170 may provide instructions to control movement of counterweight 250 to reduce the potential of erratic movement of arm 210 due to an imbalance. Controlling movement of counterweight 250 may include restricting (e.g., slowing, stopping) movement of counterweight 250. In accordance with process 1210, processing circuit 170 provides instructions to apply a break on counterweight 250 when the ratio is not within a range.

In an implementation, a first string potentiometer detects a distance (e.g., 260) of counterweight 250 from a position proximate to pivot 244. A second string potentiometer detects a length (e.g., 274) of segment 214 of arm 210. Processing circuit 170 receives information (e.g., analog, digital, voltage, current) from the first string potentiometer regarding distance 260 and information from the second string potentiometer regarding length 274. Processing circuit 170, in accordance with algorithm 186 determines a ratio of distance 260 to length 274.

In an implementation, a ratio in which distance 260 is about one-half of length 274 indicates balanced operation (e.g., positioning, movement, extension) of counterweight 250 and arm 210. A ratio of greater than or less than about one-half indicates that the operation of counterweight 250 is imbalanced with respect to the operation of arm 210.

Responsive to detecting a ratio that indicates an imbalance, processing circuit 170 provides a command to a brake to restrict movement of counterweight 250. In an implementation, a break includes pin 254, a release (not shown), and a plurality of holes (not shown) along track 252. A command from processing circuit 170 activates the release to extend pin 254. Pin 254 is biased to move toward and into holes along track 252. Upon release, pin 254 moves along a surface until it reaches and moves into a hole. Movement of pin 254 into a hole stops movement of counterweight 250.

Figure 2:
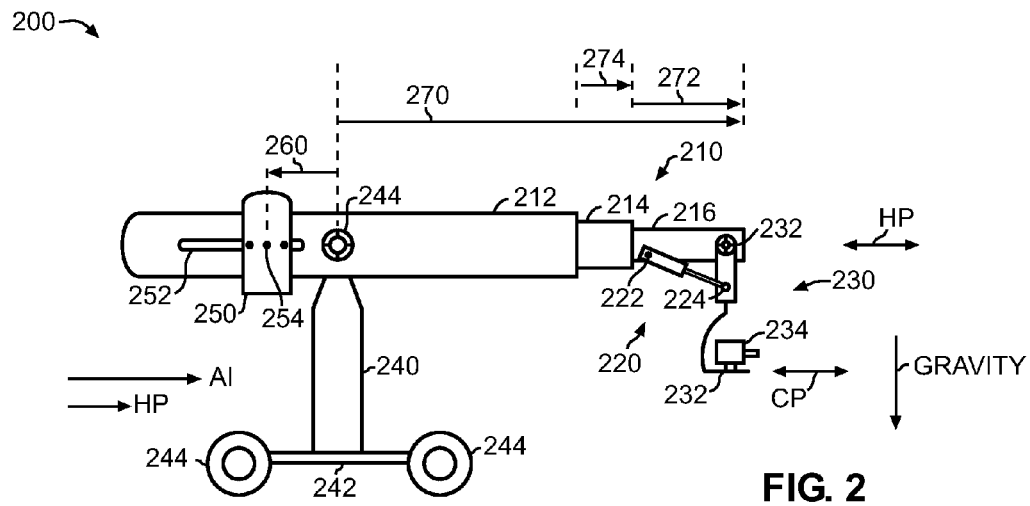
FIGS. 2-4 are an implementation of a crane for cooperation with the control system of FIG. 1.
Figure 3:
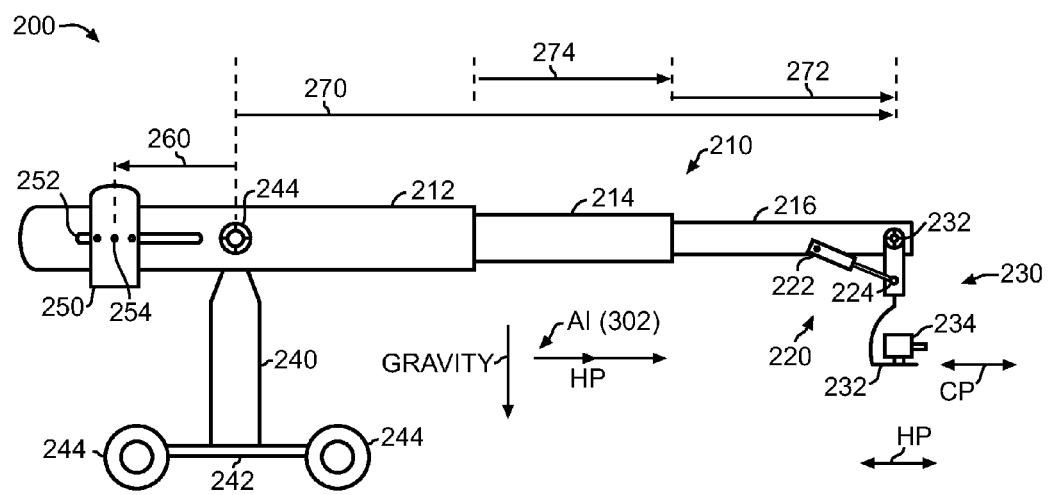
Figure 4:
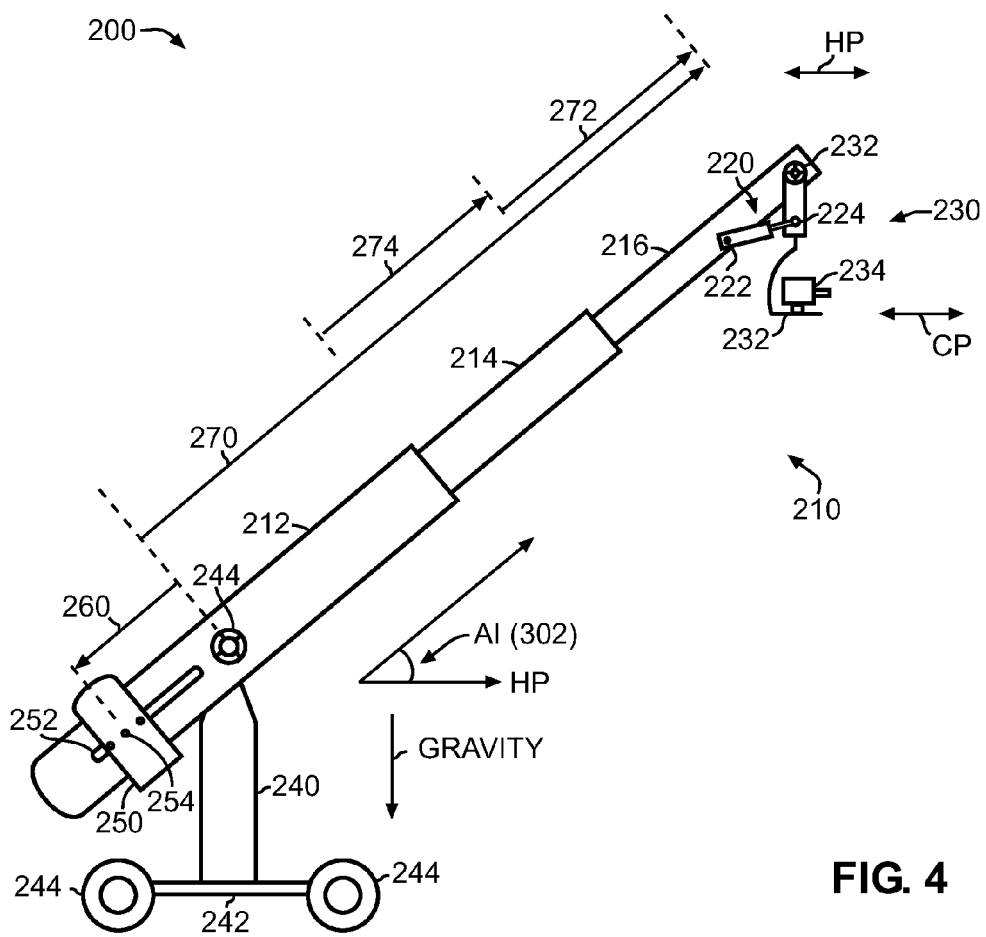
Figure 5:
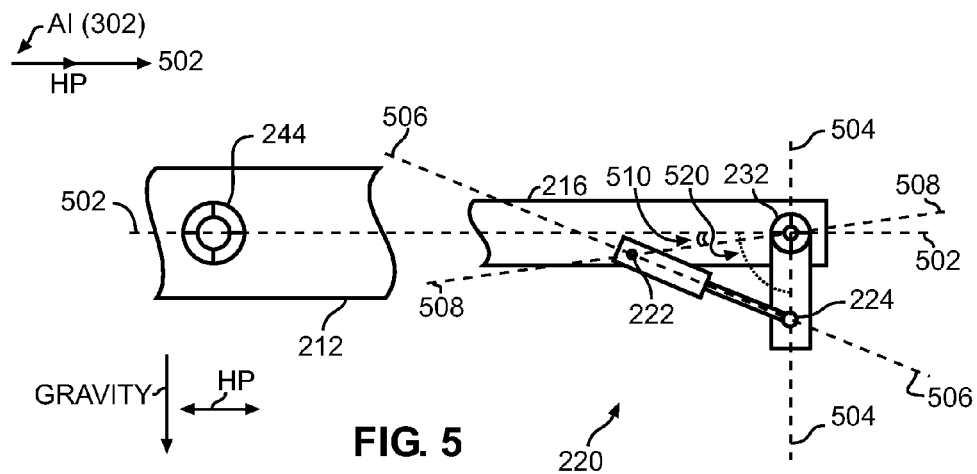
FIGS. 5-8 are diagrams of angles and distances detected or provided by the control system of FIG. 1 to cooperate with a crane.
Figure 6:
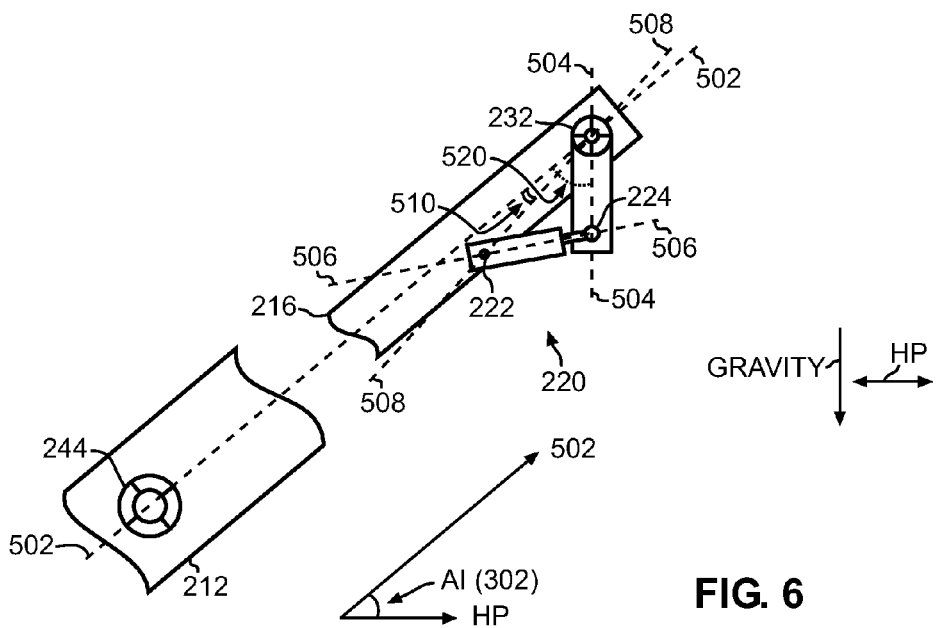

In an implementation, pin 254 is position on a side of arm 210 as shown in FIGS. 2-4. In another implementation, pin 254 is positioned on a top (not shown) of arm 210.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open-ended statement of component structures and/or functions. In the specification and claims, the words 'a' and 'an' are used as indefinite articles meaning 'one or more'. The term "and/or" as used herein refers to and encompasses any and all possible combinations of one or more of the limitations. While for the sake of clarity of description, several specific embodiments of the invention have been described, the scope of the invention is intended to be measured by the claims as set forth below.

What is claimed is:

1. A system for positioning a camera head, the camera head coupled to a provided camera crane, the camera crane includes a base, an arm pivotally coupled to the base at a proximate end-portion of the arm, and the camera head pivotally coupled to a distal end-portion of the arm, the system comprising:
a first detector that detects a magnitude of a first angle between the arm and the base;
a second detector that detects a magnitude of a second angle of the arm with respect to a direction of gravity;
an actuator mechanically coupled between the camera head and the arm; and
a processing circuit;
the processing circuit detects a rate of change of the magnitude of the first angle; and
the processing circuit moves the actuator a linear distance in accordance with the magnitude of the second angle at a rate that corresponds to the rate of change to position a camera mount of the camera head parallel to a plane.

2. The system of claim 1 wherein the first detector detects the first angle between the proximate end-portion of the arm and the base.

3. The system of claim 1 wherein the second detector detects the second angle without reference to the first angle.

4. The system of claim 1 wherein the actuator mechanically couples to the arm at a position offset from the centerline of the arm.

5. The system of claim 1 wherein the plane is perpendicular to a force of gravity.

6. The system of claim 1 wherein the first detector comprises a rotary encoder positioned at a pivot between the proximate end-portion of the arm and the base.

7. The system of claim 1 wherein the second detector comprises an inclinometer mechanically coupled to the proximate end-portion of the arm.

8. The system of claim 1 wherein the actuator comprises a linear actuator.

9. The system of claim 1 further comprising the camera crane.

10. A system for positioning a camera head, the camera head coupled to a provided camera crane, the camera crane includes a base, an arm pivotally coupled to the base at a proximate end-portion of the arm, and the camera head pivotally coupled to a distal end-portion of the arm, the system comprising:
a first detector that detects a magnitude of a first angle between the arm and the base;
a second detector that detects a magnitude of a second angle between the arm and a horizontal plane, the horizontal plane perpendicular to a direction of gravity;

an actuator mechanically coupled between the camera head and the arm; and a processing circuit; wherein the processing circuit determines an angular rate of change of the magnitude of the first angle;

the processing circuit determines a first length of the actuator in accordance with the magnitude of the second angle;

the processing circuit determines a second length of the actuator in accordance with the magnitude of the second angle plus an incremental value;

the processing circuit moves the actuator between the first length and the second length at a rate in accordance with the angular rate of change.

11. The system of claim 10 wherein the processing circuit further:

detects a change in a magnitude of the first angle with respect to a threshold; and responsive to detecting the change, determines the angular rate of change of the first angle.

12. The system of claim 10 wherein the rate that the processor moves the actuator is in accordance with:

[|(the first length−the second length)/(the second angle−(the second angle+the incremental value)) |]*(the angular rate of change).

13. The system of claim 10 wherein the second detector detects the second angle without reference to the first angle.

14. The system of claim 10 wherein the actuator mechanically couples to the arm at a position offset from the centerline of the arm.

15. The system of claim 10 wherein the processor moves the actuator to position a camera mount of the camera head parallel to the horizontal plane.

16. The system of claim 10 wherein the first detector comprises a rotary encoder.

17. The system of claim 10 wherein the second detector comprises an inclinometer mechanically coupled to the proximate end-portion of the arm.

18. A method for moving a camera head, the camera head coupled to a camera crane, the camera crane includes a base, an arm pivotally coupled to the base at a proximate end-portion of the arm, and the camera head pivotally coupled to a distal end-portion of the arm, the method comprising:

determining a rate of change in a magnitude of a first angle between the arm and the base in accordance with a first detector that detects the magnitude of the first angle between the arm and the base;

detecting a second angle in accordance with a second detector that detects a magnitude of an angle between the arm and a direction of gravity;

moving the actuator a linear distance in accordance with the second angle and at a rate that corresponds to the rate of change in the magnitude of a first angle, the actuator coupled between the arm and the camera head, wherein moving the actuator positions a camera mount of the camera head parallel to the plane.

19. The method of claim 18 wherein determining the rate of change comprises determining a difference by subtracting a magnitude of a prior first angle from a magnitude of a present first angle.

20. The method of claim 19 wherein determining the rate of change further comprises dividing the difference by a difference in time between the prior first angle and the present first angle.

21. The method of claim 18 wherein determining the rate of change comprises:

receiving a plurality of respective magnitudes of the first angle detected at a respective time;

storing the plurality of respective magnitudes and times in a memory.

22. The method of claim 18 wherein moving in accordance with the second angle comprises determining a linear rate.

23. The method of claim 18 wherein moving at the rate that corresponds to the rate of change comprises multiplying the rate of change by a linear rate.

24. A system for positioning a camera head, the camera head coupled to a provided camera crane, the camera crane includes a base, an arm pivotally coupled to the base at a proximate end-portion of the arm, and the camera head pivotally coupled to a distal end-portion of the arm, the system comprising:

a first detector that detects a first inclination of the arm relative to the base;

a second detector that detects a second inclination of the arm with respect to a direction of gravity;

a linear actuator mechanically coupled between the camera head and the arm; and a processing circuit; wherein the processing circuit determines a present length of the actuator and a next length of the actuator in accordance with a magnitude of the second inclination;

the processing circuit determines a rate of movement between the present length of the actuator and the next length of the actuator in accordance a rate of change of the first inclination; and the processing circuit moves the actuator from the present length to the next length at the rate of movement to position a camera mount of the camera head parallel to a plane.

* * * * *